United States Patent [19]

Pocock et al.

[11] Patent Number: 4,905,094
[45] Date of Patent: Feb. 27, 1990

[54] SYSTEM FOR AUDIO/VIDEO PRESENTATION

[75] Inventors: Terrence H. Pocock, Delaware; Richard M. McNorgan, London; Gary B. Allen, Burlington; Peter J. M. Coumans, London, all of Canada; Karl W. McCalley, Palatine; John R. Bertram, Deerfield, both of Ill.

[73] Assignee: Telaction Corporation, Schaumburg, Ill.

[21] Appl. No.: 213,357

[22] Filed: Jun. 30, 1988

[51] Int. Cl.[4] .......................... H04N 5/76; G11B 7/00
[52] U.S. Cl. .................................... 358/342; 358/341; 358/86; 358/335; 360/35.1; 360/72.1; 364/401; 364/518
[58] Field of Search .............. 358/310, 335, 341, 342, 358/343, 906, 909, 86; 360/10.1, 19.1, 72.1, 72.2, 35.1, 9.1, 33.1, 39; 364/401, 518; 235/375, 383

[56] References Cited

U.S. PATENT DOCUMENTS

| | | | |
|---|---|---|---|
| 4,009,331 | 2/1977 | Goldmark et al. | 358/310 |
| 4,395,740 | 7/1983 | Yuen et al. | 360/72.2 |
| 4,567,531 | 1/1986 | Tabata | 358/335 |
| 4,775,935 | 10/1988 | Yourick | 364/401 |

Primary Examiner—Robert L. Richardson
Attorney, Agent, or Firm—Amster, Rothstein & Ebenstein

[57] ABSTRACT

The present invention relates to a system for assembling a network of presentations comprising still video images with associated audio messages. The video images and audio messages are first recorded on separate recording mediums and then combines as a video/audio presentation network recorded on a video disc. The video disc can then be incorporated as part of the data base of an interactive communication system which transmits the presentations to subscriber's of the system.

13 Claims, 5 Drawing Sheets

SYSTEM FOR AUDIO/VIDEO PRESENTATION

BACKGROUND OF THE INVENTION

The present invention relates to the arrangement and storage of a video/audio presentation network on a medium from which it can be retrieved for viewing.

Systems whereby a customer can purchase goods and services with the aid of just his telephone and television receiver are known. Lists of items are presented on the subscriber's television screen and he selects the items he wishes to purchase by pressing indicated keys on his telephone. It has also been proposed that still pictures of the various items and an accompanying audio message can be stored on video discs and transmitted to the customer on demand, but this does not give him the impression that he is in an actual store. Furthermore, the information cannot be changed except by making a new video disc, and this can take nearly two weeks. Such a system has very little flexibility.

BRIEF SUMMARY OF THE INVENTION

It is anticipated that the present invention will be used in conjunction with an interactive cable television system that has been developed to distribute information to subscribers' televisions at their request. Such system concerns a shopping service where subscribers shop at home through an "electronic mall". This system is distinguished from home shopping channels in that it allows the subscribers to select which products or services they will view on their televisions by use of in-home subscriber apparatus, such as telephones or CATV keypads.

In operation, the subscriber tunes to a channel and requests connection to a remote location by either dialing a predetermined telephone number, or accessing via a CATV reverse channel. As soon as the system identifies the subscriber, his television begins to display still frame video, and possibly accompanying audio information, and directories of "electronic stores" comprising products or services that may be either entered or passed, examined in further detail, saved for further consideration, or purchased just by touching keys on a touch-tone telephone or CATV keypad in response to prompts on the television screen. A main frame host computer controls the flow of information in this system. Such information includes the presentations representing the products or services offered to subscribers. These presentations are stored as optical signals on video discs and as digital signals on magnetic discs.

In order to give the subscriber the feeling that he is in an actual store, he is first presented with a segment comprised of a series of still pictures, and possibly an accompanying audio message that may describe the various departments or types of merchandise, that are available. At the same time, a menu may be displayed on his television screen naming the departments or types of merchandise he can view, and the combination of digits that must be pressed on his touch-tone telephone or CATV keypad in order to view them. When a combination of digits is pressed, a new segment of slides and possibly audio material are presented along with another menu. Each new segment or collection of segments comprising a presentation will be referred to hereinafter as a node. In effect, a video/audio presentation network is created which is essentially a tree of choices starting with a trunk corresponding to the main entrance, main limbs corresponding to the departments, and branches corresponding to different items in each department. Each presentation at a node in the network includes one or more video segments. A segment is comprised of one or more video images (still pictures) and possibly one or more audio images (audio messages.) The video image may be stored as a still frame and as graphics commands for computer-generated overlayed graphics. At appropriate nodes, one of the possible choices will be to go back a node closer to the trunk so that the customer will not be left out on a limb so to speak. The navigation permitted by the successive presentation of menus simulates very closely the experience of being in an actual store.

Flexibility in navigation is achieved by storing the possible menu in a changeable file in a main computer and providing means for altering the menus with a personal computer. The location on the video disc of the segment of stills and audio to be displayed at each node is recorded in a segment file stored in the main computer.

Sooner or later it is hoped that the customer will reach a point where he has decided on a purchase. He will then be presented information as to factors such as size, color and price that he must know before he can indicate a decision to buy. Such product information is stored in a product file in the main computer that can be changed by interaction with the personal computer. The product file may be limited to words that can be superimposed on a still picture derived from the video disc. Thus, it is possible to indicate a new price or to remove a specific item that is no longer available. More importantly, it is possible to add a new node to the navigation and write in new information about an item. To the extent desired, the product information file may include means for setting a CAD program in operation that will present drawings.

In accordance with another aspect of this invention, information as to the segment of still pictures and audio messages provided by the store management is presented in such form that it can readily be recorded on video and magnetic discs and in such manner that it can be correlated with the nodes encountered during navigation from node to node through the store i.e. the video/audio presentation network. Briefly, this is effected as follows. The store management provides a series of chromes or colored slides that may be an artist's version of each of the still pictures to be recorded on a video disc. Each of these chromes must be accompanied by descriptive words from which its order in a segment can be determined. After being converted to digital form in respective television frames, they are stored in the auxiliary storage of a Harris Iris II Digital Still Store System (Harris). The management must also supply audio tapes in which the SMPTE time codes for the beginning and end of each audio segment are known. A personal computer communicates with the main computer so as to set up an address in the navigational file for a node, an address in a segment in the segment file, and addresses in the product file for information on particular products. The personal computer is provided with the information as to the SMPTE time codes for the beginning and end of each segment.

The audio processing begins by recording the audio tape or tapes on a conventional tape recorder operated by a controller. Segment files identifying each segment in the presentation network are stored in the personal computer and the main computer. The main computer instructs the controller to cue to a certain location on the audio tape based on information from the segment file which specifically identifies each audio cut by SMPTE time codes. When the start time of an audio cut is reached on the audio tape, the main computer instructs an encoder to begin encoding the audio cut. The encoder takes the audio signals from the tape recorder and transforms them into a format comparable to video frames. These video formatted audio frames are then stored in the internal memory of the encoder. When all of the audio cut has been transformed by and stored in the encoder, the main computer instructs the encoder to send the audio frames to the Harris where they are stored in its auxiliary storage, but on a disc separate from the disc on which was recorded the video frames. The audio frames stored in the Harris are stored with identification codes designated in the segment file. With both the video and audio frames stored in the Harris, the main computer instructs the Harris to assemble the audio and video frames as video/audio segments on a one-inch video tape. On the video tape, the audio frames representative of a segment are serially recorded, followed by the serial recording of the video frames. Each segment typically comprises one to five video frames and zero to four audio frames.

The frames are then recorded onto the one-inch video tape in the following manner. The SMPTE time code for each frame is transmitted from the main computer to a Vertical Interval Timing Code Insertion device (VITC). The main computer instructs the Harris to send the frame to the VITC inserter. Next, the VITC inserter inserts the time code into a line of the vertical interval of the frame just received in a manner which can be both recorded onto a video disc and also detected and read in digital form from the recorded video disc, thus tagging it for future identification. The VITC inserter transmits the newly tagged frame to the one-inch video tape recording device where it is recorded. The main computer then stores the frame identification together with the SMPTE time code for later use in verifying that the video disc recording was done without missing frames and to determine which frames reside on which video disc tracks.

As recorded on the one-inch video tape, the audio and video frames are thus identified according to the identification codes of the segment file in the main computer. The segments stored on the one-inch video tape are recorded on to a video disc using a conventional video disc mastering process.

After the video disc has been produced, it is then inserted into one of the video disc players in the Video Display Subsystem (VDS) of the interactive communication system. The main computer directs the VDS to read the tracks of the disc one by one. As each track is read, a Vertical Interval Time Code Reader device (VITCR) detects and reads the SEMPTE time code information recorded during the premastering process. Each time code is then transmitted to the main computer where it is matched with its stored counterpart. The track number from the code—and thus the corresponding frame—is then matched to the expected track number. Any mismatches are reported and the new track number used to replace the stored track number. The contents of the video disc and the main computer files are thus coordinated.

The SMPTE time codes are also used in verifying the operation of certain hardware and software comprising the interactive communication system. Here, the time codes are sent by the VITCR to the main computer as product or service presentations and menus are displayed as a result of user telephone touch tone input. The main computer records the time code information for later use to determine whether the correct frames were displayed for the touch tones generated by the user.

An object of the present invention is to provide an efficient system whereby a video/audio presentation network can be designed and stored on a medium from which it can be readily retrieved for viewing.

It is a further objective of the present invention to provide a means for designing and storing a video/audio presentation network that can be used in conjunction with an interactive communication system for merchandising products and services.

The present invention is directed to a system for providing a retrievable network of video presentations. Each such video presentation includes one or more video images which may be associated with an audio segment. A network of video presentations is stored on a retrievable storage medium and incorporates a plurality of permissible paths between the video presentations.

The system includes a means for storing a plurality of video images on a first recording medium and a means for storing a plurality of audio segments on a second recording medium. In a data base, the permissible pathways between video presentations in the network are defined, as well as the association between audio frames, if present, and one or more of the video images. The system further includes a means for storing on a third recording medium a plurality of video images with associated audio frames according to instructions defined in the data base. The video images and the associated audio images are stored on the third recording medium as video frames with each of the frames being electronically identified for retrieval.

DETAILED DESCRIPTION OF THE INVENTION

Figure 1:
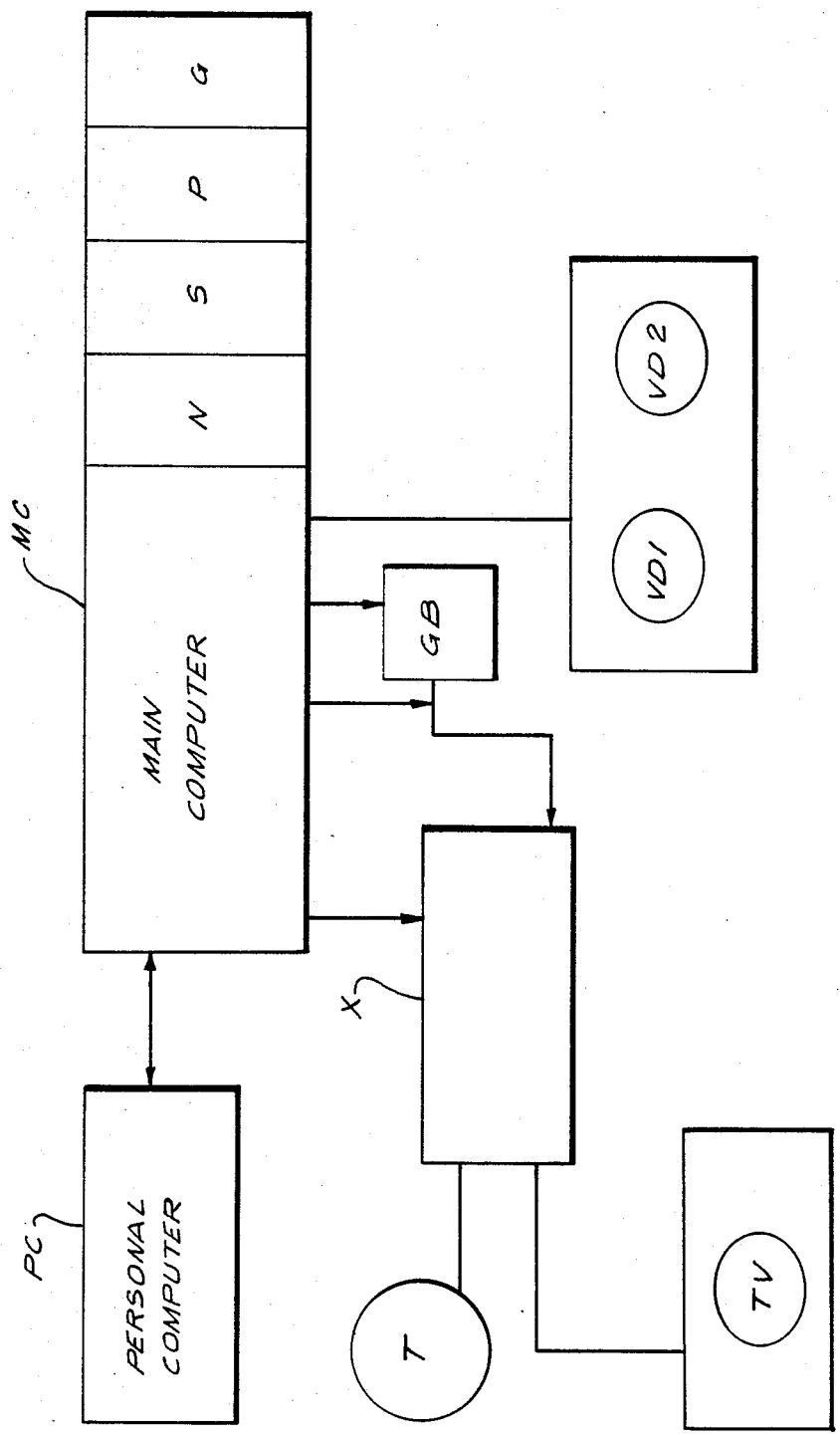
FIG. 1 is a block diagram of an electronic store.

Reference is made to FIG. 1 for an overall description of the operation of an electronic store that is the subject of this invention. A personal computer (PC) that is in communication with a main computer (MC) establishes addresses of nodes in a file N, addresses of corresponding segments of information in a file S and product data such as size, color, price, etc in a file P. When a customer gets in contact with the telephone exchange X through his telephone T, he then presses keys identifying the presentation network representative of the store through which he wishes to shop. This causes MC to identify the address of the first node, which is probably the entrance to the electronic store, and the address of the corresponding segment of video and audio information that is to be represented at that node. With this information, MC sends the menu for the first node to the customer's TV set. MC also identifies the location on a video disc, VD1 or VD2, of a segment of video and audio frames that is to be presented at this node, as well as any graphics commands G. If there are graphics command, they are transmitted to a graphics display board GB for interpretation and drawing of the picture, which is combined with the still video prior to being sent to the customer. They are then transmitted so as to be displayed on the television set.

Not all nodes will require product information, but when the customer gets to a point of picking out size, price and color at a particular node, the appropriate product information will be transmitted to the TV set. All information in the files N, S, G, and P can be readily changed.

Figure 2A:
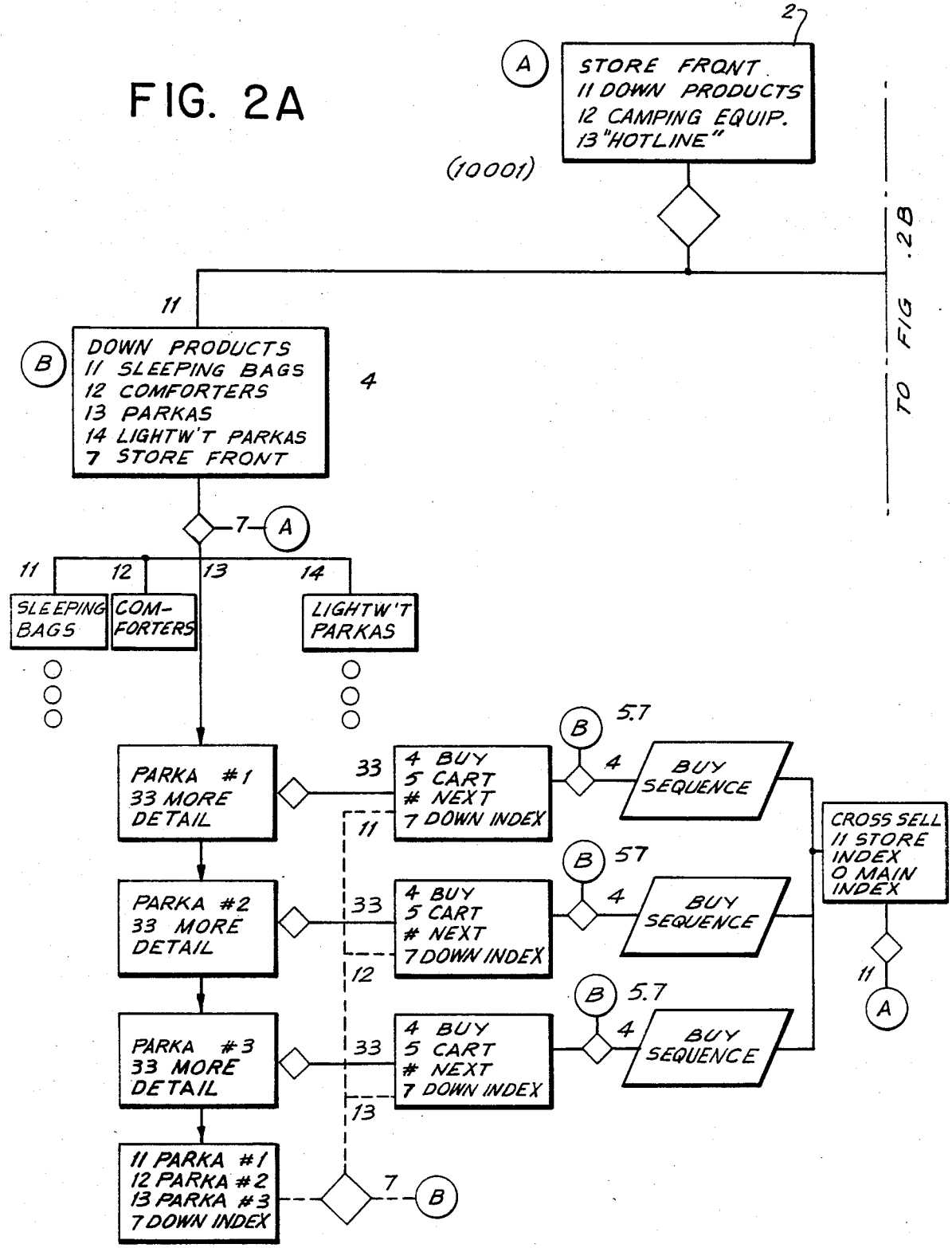
FIGS. 2(A) and 2(B) illustrate various nodes encountered in navigating through a fictitious store call The Great Outdoors.
Figure 2B:
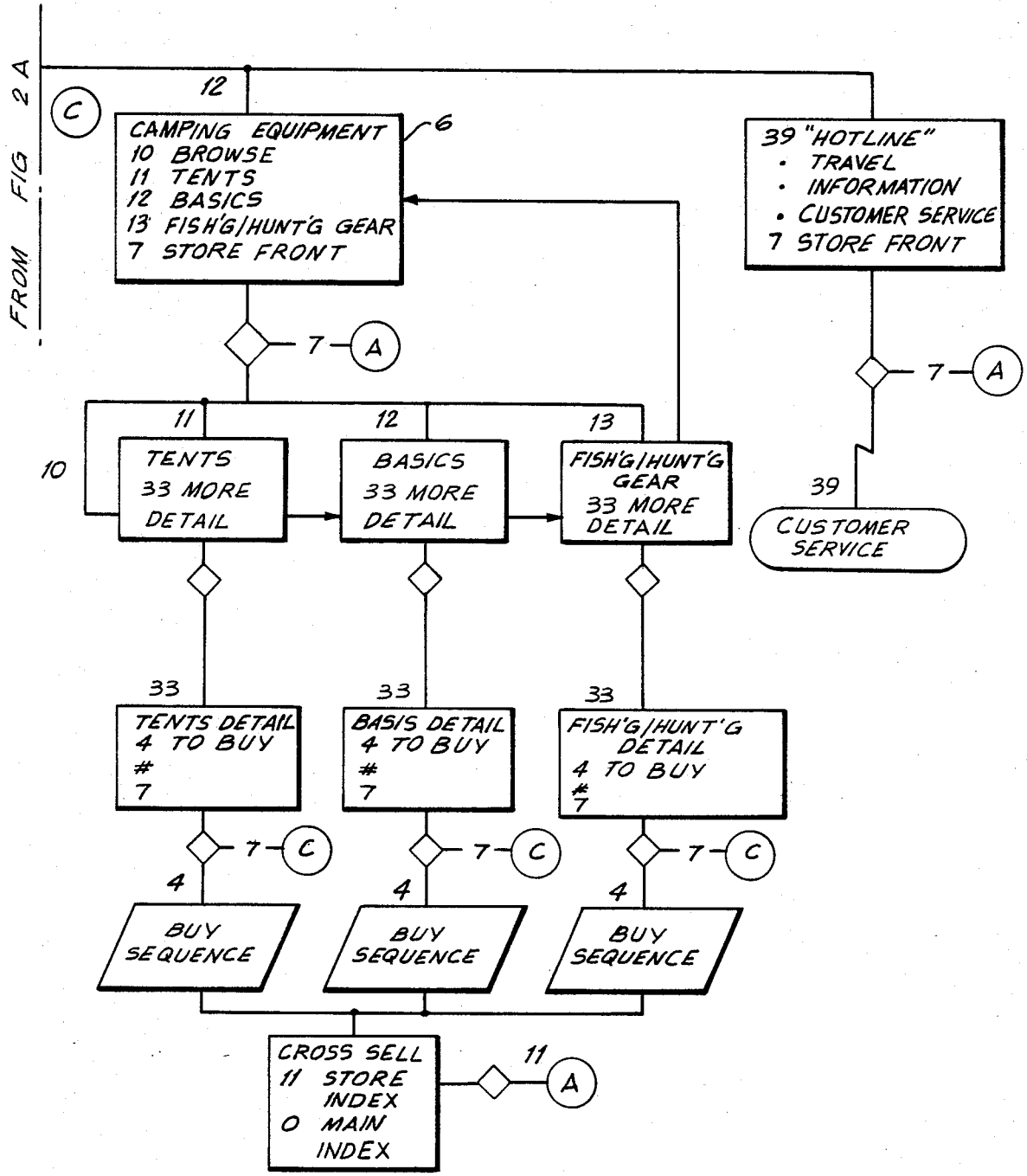

Reference is now made to FIGS. 2(A) and 2(B) which are a flow chart showing several nodes in the presentation network of a fictitious store called The Great Outdoors. When the customer initials access to this store (either directly or from a "mall"), the menu shown in block 2 appears on his television screen along with the first segment for the store which includes a series of still pictures and an audio message.

From block 2 there are three nodes to which the customer can go: Down Products by pressing 11 on his telephone, Camping Equipment by pressing 12 and Hotline by pressing 13. If he presses 11, the main computer will cause the menu in block 4 to appear on the television screen. Segments depicting products listed in the menu can be accessed by pressing the telephone keys representing the number shown next to the listed product. Accessing segments is done by identifying the address of the segment on the video disc. With the above explanation, the remaining blocks in FIGS. 2(A) and 2(B) are self-explanatory. Note, however, that the navigation permits return to an earlier node, e.g., an opportunity is given to go back to the beginning of the store's presentation network.

Figure 3:
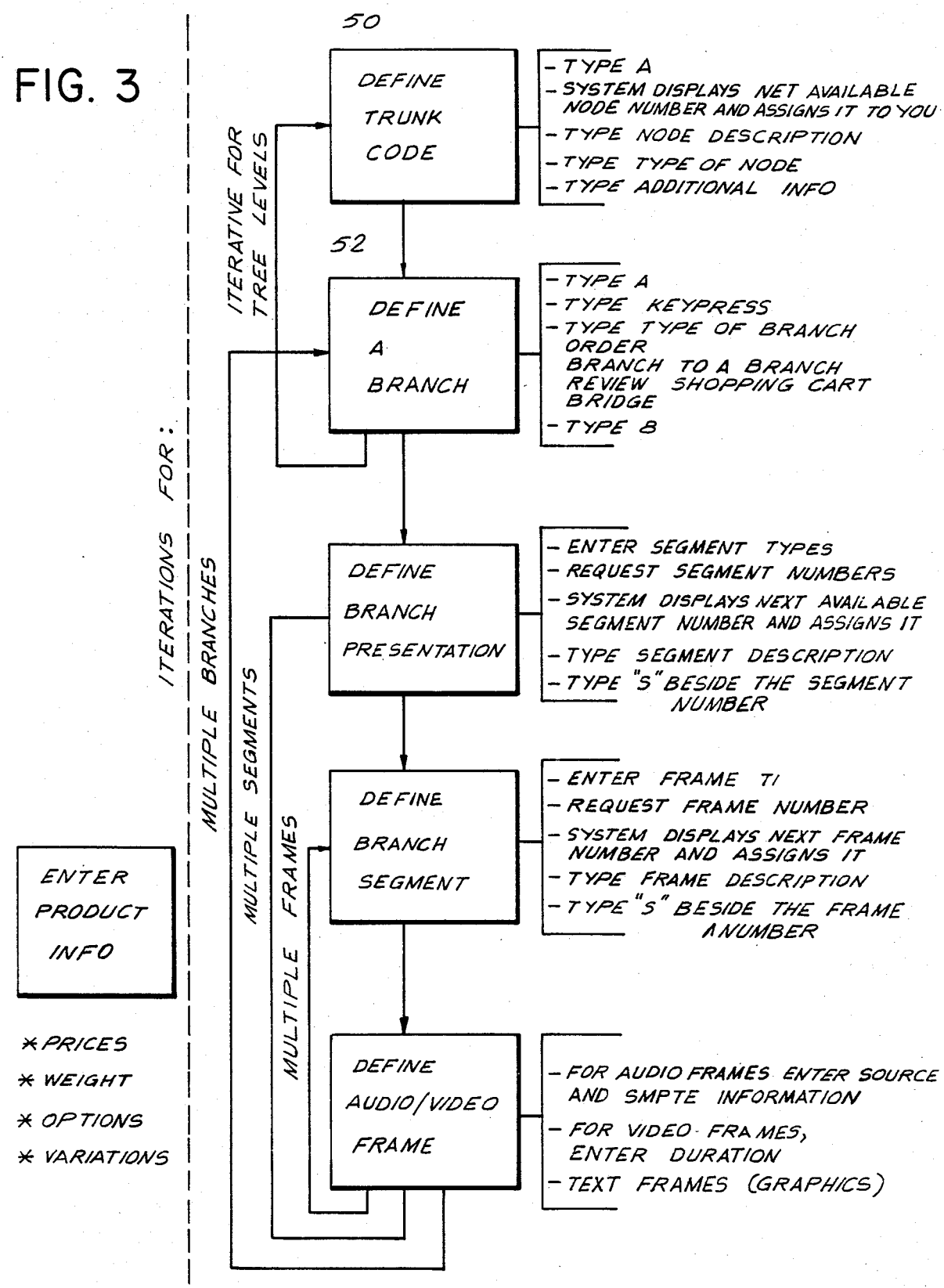
FIG. 3 illustrates how the navigational information can be formed on the navigational file.

Reference is now made to FIG. 3 for a description of how a personal computer can organize the nodes of a presentation network and identify segments to be displayed at each node in the network. In general, this is accomplished by correlating addresses in the personal computer's navigation file with addresses in its segment file. These files are also stored in the main computer.

The manner in which the first node, which is the trunk of the tree, is defined as shown by block 50 of FIG. 3 and the accompanying instructions. An "A" is typed on the keyboard of the personal computer, and the main computer provides the personal computer with the next address in its navigation file N, such as 10001 which is indicated in FIGS. 2(A) and 2(B) as the address of block 2. The name of the store such as The Great Outdoors would then be typed in along with an identification that this is the "entry" to the store, designated by entering a node type of "1". Additional control information is also entered.

With the "trunk" identified, the system is then used to attach "branches" to the trunk. For each branch, an "A" is again typed followed by a number such as 11 and a description of a branch such as Down Products as indicated by the instructions accompanying block 52. The process then proceeds to block 54 by typing the number "8". The presentation components for the system are then displayed. A segment may be added by typing an "A", followed by the segment type. The computer responds with the next available segment in segment file "S". The segment description is then entered next to the number. A typical description might be "Down Jackets—Seg. #1". The system then adds the segment to the file. Next, "S" is typed beside the segment number to transfer it to the segment screen. This screen allows the user to enter a request for frame numbers and type in a frame description that may be used later to relate the number to the actual chromes. A list of all frame numbers, and to their descriptions may be printed to allow manual tagging of the chromes with their system assigned number. With the frame numbers added, an individual frame may be selected to add information by typing an "S" beside it. An additional screen is presented which then allows for entry of the duration for video frames and source and SMPTE for audio "frames". Control is returned to block 52 by typing a series of "X's", where "A" may be typed, and the process is repeated until all branches and their associated segments have been treated in a like manner.

Figure 4:
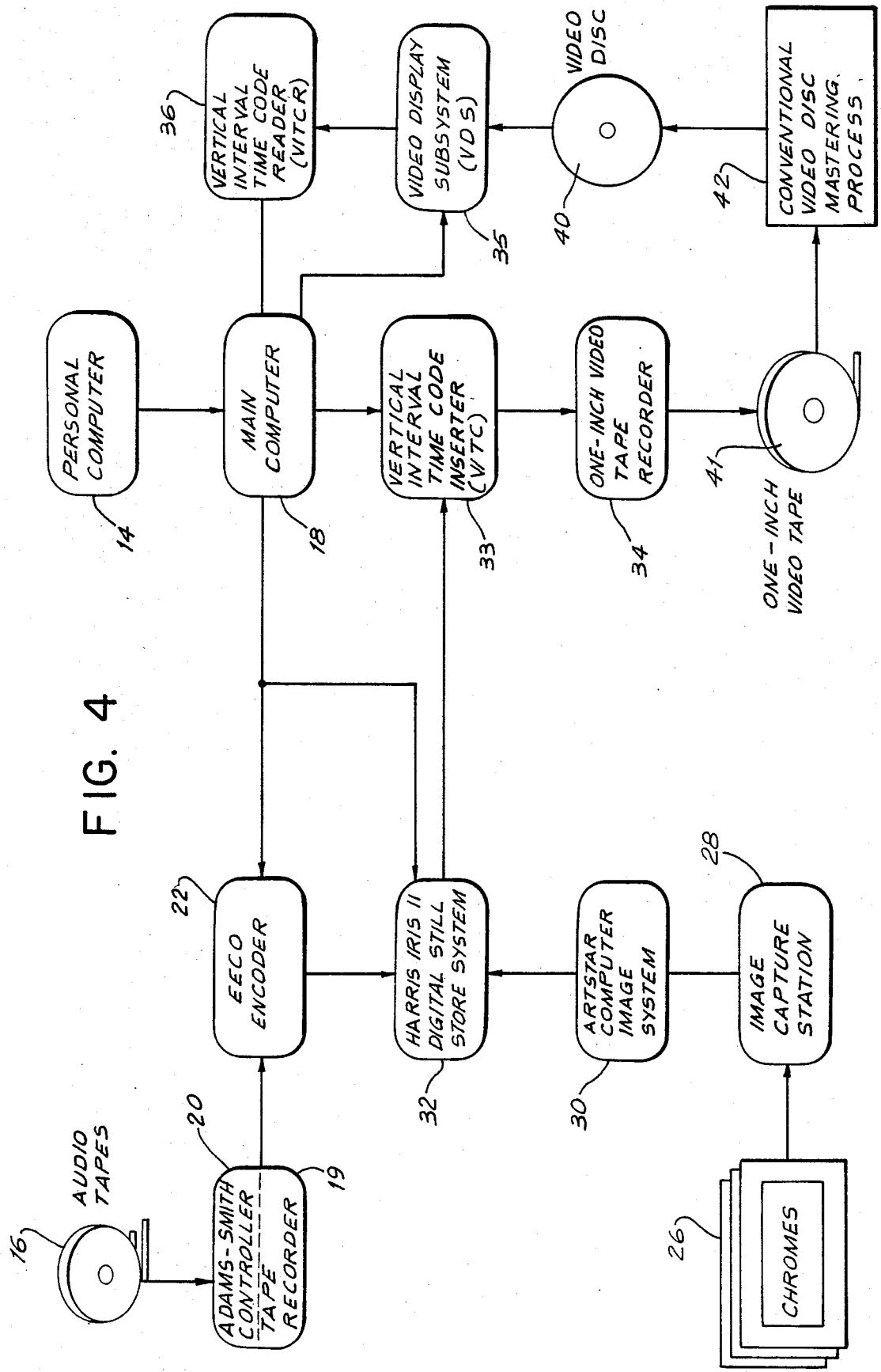
FIG. 4 is a block diagram illustrating the premastering process which forms the video and audio frames on a magnetic tape that can then be recorded on a video disc.

Reference is now made to FIG. 4 for a description of the premastering operation of this invention whereby the video and audio frames for each segment in the presentation network are recorded on a one-inch magnetic tape. The video and audio frames representative of each segment are recorded from the magnetic tape onto a video disc.

The company desirous of offering its products or services through the interactive communication system previously described develops a video/audio presentation network of its "electronic store" by developing segment, navigation and product files in a personal computer. Along with the files developed in the personal computer, the company reduces each video image of a segment to a color slide or chrome, and produces an audio tape or tapes of the various audio segments associated with the chromes. Thus, the presentation network that the company has designed comprises a plurality of nodes each of which represents a video presentation. Each of the video presentations includes one or more video segments. In turn, each video segment comprises one or more video images, i.e. still pictures and/or accompanying computer graphics, which may be accompanied by an audio segment. Typically, the video segments comprise one to four still pictures with up to 40 seconds of an accompanying audio segment.

As to the specific files generated in the personal computer, they represent information needed in organizing and defining the various video and audio segments of the presentation network. The segment file identifies each of the segments, which include video frames and audio frames. Each segment is identified by a unique identification number. For example, the first three places in the identification number may be abbreviations for the particular company, and the next six numbers may represent the specific segment. Thus, for example, the identification number TGF200001 represents segment 200001 of The Great Outdoors store. The identification number is further defined by the first video image in a segment by the designation V1 after the identification number, and a subsequent video image would be identified as V2, and so on for other video images. Any audio frame associated with a segment would be identified by the segment identification number, and "A" indicating an audio frame and a SMPTE time code which indicates the beginning and end of the audio frame.

The navigation file identifies the pathways between the nodes in the presentation network. As for the product file, it provides a written description of the product being offered such as its color and sizes. The segment, navigation and product files comprise a data base generated by operation of the personal computer 14. This data base is also loaded into the main computer designated as 18 in FIG. 4. With the data base stored in main computer 18, the chromes designated 26, and the audio tapes designated 16, the premastering operation results in the recording of the video/audio presentation network on a video disc from which segments of the network can be retrieved for viewing.

In the premastering operation, the chromes 26 are electronically recorded by a color video camera at the Image Caption Station 28. The color video camera, such as a Sony DXC/3000P, records the video image from a chrome 26 in the form of an analog signal and transmits this signal to an ArtStar Computer Image System (ArtStar) 30. The ArtStar 30 is a video composition system used primarily in the production of animation films, and comprises generally the following components: a computer processing unit, a keyboard, a data monitor and a color monitor, and a bit pad. By using ArtStar 30, the image originally captured in chrome 26 can be modified such as by changing the color of components in the image, or by changing the configuration of objects in the image. In general, ArtStar 30 has the capability of making almost any type of modification to the image captured from chrome 26. The output of ArtStar 30 is an analog signal which is sent to a Harris-Iris II Digital Still Store System (Harris) 32. In Harris 32, the analog signal from the ArtStar 30 is received by a frame synchronizer which converts the analog signal into a digital signal. This digital signal is then stored in the Harris auxiliary storage. The video frame stored in Harris 32 is identified by the same identification number that the chrome 26 was identified by in the segment file stored in main computer 18. For example, the first three characters in the identification number may represent the particular company developing the presentation network, the next six numbers could represent the specific video segment, and the remaining characters would include the letter "V" and the number representing a specific video frame in that segment.

The audio tape 16, which includes a series of audio cuts, is placed in a conventional tape recorder/player 19 operated by an Adam Smith Controller System (Adam Smith) 20. Adam Smith 20 receives its operating instructions from the main computer 18. In its first commands to the Adam Smith 20, main computer 18 instructs the Adam Smith 20 to cue to a certain location on the audio tape 16 based on information from the main computer's segment file. In this instance, cuing means to find the starting location of a specific audio cut on the tape 16 and pre-rolling the tape 26 for approximately five seconds. When the start time of an audio cut is reached on the tape 16, main computer 18 instructs an EECO Encoder 22 to begin encoding the audio cut. The EECO Encoder 22 takes the audio signal from the tape recorder/player and transforms it into video frames. Each video frame typically has no more than 10 seconds of audio recording. Also, EECO Encoder 22 stores the audio frames in its internal memory until in has captured the entire cut, which does not typically exceed 40 seconds or 4 frames. At such time, main computer 18 instructs EECO Encoder 22 to display the first video frame representing the audio cut it has just recorded. Concurrently, the main computer instructs the Harris 32 to store the audio frames (which are in a video frame format) in its auxiliary storage, but on a disc separate from the disc on which was stored the video frames. The audio frames stored in Harris 32 are recorded along with identification numbers the same as the identification numbers originally designated for the audio cut in the segment file. Thus, for example, the encoded audio frames could have identification numbers where the first three characters represent the company having developed the audio cut, the next six segments would represent the segment identification number, and the remaining characters would include the letter "A" and the number of the specific encoded audio frame.

After all the video and audio frames have been stored in Harris 32, main computer 18 instructs Harris 32 to assemble the video and audio frames as video/audio segments on the one-inch video tape of recorder 34. In the process of assembling the segments, main computer 18 instructs recorder 34 to capture a single frame at a time.

Main computer 18 transmits the SMPTE time code for each image to the Vertical Interval Time Code Insertor (VITC) 33. The Harris 32 then transmits the image to VITC 33 on cue from main computer 18. VITC 33 encodes the time code into one of the lines in the vertical blanking interval for the frame as it is being transmitted through VITC 33 to the one-inch video tape recorder 34. Main computer 18 also stores the time code and the anticipated video disc track number onto which the frame will be recorded with the frame identification for later verification as described below.

This process is first repeated for all the encoded audio frames and then likewise for all the video frames. Typically, a segment comprises one to five video frames and zero to four encoded audio frames.

After all segments have been recorded on one-inch video tape 41, the one-inch video tape 41 is used in a conventional video disc manufacturing process 42 to produce video disc 40.

Video disc 40 is then inserted into one of the video disc players in Video Display Subsystem 35 of the interactive communication system. Main computer 18 causes Video Display Subsystem 35 to read each track in turn, beginning with track number 1 of video disc 40. The video output signals of Video Display Subsystem 35 are intercepted by Vertical Interval Time Code Reader (VITCR) 36 which detects, digitizes and transmits the previously recorded SMPTE time code to main computer 18. Main computer 18 compares the time code so received to the time code value previously recorded for each track anticipated for video disc 40. Any mismatches are reported, and main computer 18 files are updated with the correct track for the frame so that correct track references are available when required for presentation.

Video disc 40 becomes part of the data base of the interactive communication system which transmits the presentations stored on video disc 40 to subscribers. The files stored in main computer 18 are utilized by the interactive communication system to identify the location of specific segments on video disc 40 and to define the navigation between such segments.

Although the illustrative embodiment of the present invention has been described in detail with reference to the accompanying drawings, it is to be understood that the invention is not limited to this precise embodiment and that various changes or modifications may be effected therein by one skilled in the art without departing from the scope or spirit of the invention.

What is claimed is:

1. A system for providing a retrievable network of video presentations, each such video presentation including one or more video images which may be associated with an audio segment, said network of video presentations being stored on a retrievable storage medium and incorporating a plurality of permissible pathways between said video presentations, said system comprising:
   means for storing a plurality of video images on a first recording medium,
   means for storing a plurality of audio segments on a second recording medium,
   means for defining in a preselected format said permissible pathways in said network between said video presentations, and the association between each said audio segment, if present, and one or more of said video images, and
   means for storing on a third recording medium said plurality of video images with said associated audio segments according to said defining means, said video images and said associated audio segments being stored on said third recording medium as video frames with each said video frame being electronically identified for retrieval.

2. The system according to claim 1 further comprising:
   means for recording on the tracks and associated frames of a video disc said video images and audio segments stored on said third recording medium, wherein each frame includes frame identification information recorded in the vertical blanking interval thereof.

3. The system according to claim 2 further comprising:
   means for detecting and reading said frame identification information recorded in the vertical interval of each frame on a track of said video disc.

4. The system according to claim 3 further comprising:
   means for comparing said detected frame identification information to a previously recorded file of frame identification information, and correcting said file where said detected frame identification information does not agree with said previously recorded frame identification information.

5. The system according to claim 4 wherein said correction of said file being due to manufacturing errors in said video disc.

6. The system according to claim 1 wherein said first recording medium is a magnetic disc.

7. The system according to claim 1 wherein said second recording medium is a magnetic tape.

8. The system according to claim 1 wherein said third recording medium is a video tape.

9. The system according to claim 1 wherein each video presentation includes one or more video segments, each video segment includes one to five video images which may be associated with an audio segment, said audio segment being approximately 40 seconds or less in length.

10. The system according to claim 1 wherein said means for defining the permissible pathways in said network is in a data file stored in a computer controlling a recording means associated with each of said first, second and third recording medium.

11. The system according to claim 1 further comprising means for transferring said plurality of video images and associated audio segments from said third recording medium to a video disc.

12. Apparatus for recording segments of audio and video information onto respective frames of a magnetic tape comprising:
   an audio tape having SMPTE time codes identifying the ends of audio information that is to be used in a given segment,
   an encoder for translating audio signals into a video frame format,
   a plurality of chromes,
   means for scanning a chrome so as to produce a frame of analog video signals,
   means for translating the analog video signals into corresponding digital video signals,
   means for altering said digital video signals so as to form a frame having a desired image,
   means for combining the audio and video frames into a series for a given segment,
   means for converting digital video frames into corresponding analog video frames, and
   means for recording said series of analog frames onto a magnetic tape.

13. Method for creating still-video and audio presentations stored on a video disc, comprising the steps of:
   (a) designing a plurality of still-video frames;
   (b) storing in the form of digital information the video frames on a first storage medium;
   (c) identifying each of the video frames on said first storage medium with a unique address;
   (d) composing an audio message to be associated with said still-video frames;
   (e) electronically storing the audio message in the form of audio frames on a second storage medium;
   (f) identifying each audio frame on the second storage medium with a unique address;
   (g) combining the still-video frames on said first storage medium with the audio frames on said second storage medium to form a still-video/audio presentation on a video disc.

* * * * *